(12) United States Patent
Johannsson et al.

(10) Patent No.: US 7,527,730 B2
(45) Date of Patent: May 5, 2009

(54) WATER FILTRATION SYSTEM AND ITS USE

(75) Inventors: Ragnar Johannsson, Kopavogur (IS);
James E. Timmons, Dickinson, TX (US); John L. Holder, Courtenay (CA); Michael B. Timmons, Ithaca, NY (US)

(73) Assignee: Holder Timmons Engineering, LLC, Ithaca, NY (US)

( * ) Notice: Subject to any disclaimer, the term of this patent is extended or adjusted under 35 U.S.C. 154(b) by 193 days.

(21) Appl. No.: 10/591,675

(22) PCT Filed: Oct. 4, 2004

(86) PCT No.: PCT/IS2004/000016
§ 371 (c)(1),
(2), (4) Date: Sep. 1, 2006

(87) PCT Pub. No.: WO2005/033018
PCT Pub. Date: Apr. 14, 2005

(65) Prior Publication Data
US 2007/0056890 A1    Mar. 15, 2007

(30) Foreign Application Priority Data
Oct. 3, 2003    (IS)    ......... 6975

(51) Int. Cl.
*A01K 63/04* (2006.01)
*C02F 3/06* (2006.01)
*C02F 3/08* (2006.01)

(52) U.S. Cl. ............ 210/167.25; 210/167.22; 210/616; 119/259; 119/260

(58) Field of Classification Search ............ 210/167.21, 210/167.25, 167.26, 263, 264, 266, 283, 210/150, 151, 616, 617; 119/259, 261, 260
See application file for complete search history.

(56) References Cited

U.S. PATENT DOCUMENTS

| | | | | |
|---|---|---|---|---|
| 1,962,663 A * | 6/1934 | McGill | ........ | 252/179 |
| 2,300,014 A * | 10/1942 | Saussure | ........ | 210/266 |
| 2,765,259 A * | 10/1956 | Schwalge | ........ | 196/46.1 |
| 3,342,340 A * | 9/1967 | Shindell | ........ | 210/282 |
| 4,427,548 A | 1/1984 | Quick, Jr. | | |
| 4,606,823 A * | 8/1986 | Lucas, III | ........ | 210/282 |
| 5,595,653 A * | 1/1997 | Good et al. | ........ | 210/289 |
| 5,747,311 A | 5/1998 | Jewell | | |
| 6,015,497 A | 1/2000 | Steen, Jr. | | |
| 6,666,965 B1 * | 12/2003 | Timmons | ........ | 210/150 |

* cited by examiner

*Primary Examiner*—Fred Prince
(74) *Attorney, Agent, or Firm*—Birch, Stewart, Kolasch & Birch, LLP

(57) ABSTRACT

The present invention relates to a filtration system for purifying water, in particular aquaculture water. Furthermore, the invention relates to a method of purifying water wherein water is supplied to a filtration system, comprising filtration medium for filtering water and a grid for preventing water channeling within the filter wherein said grid comprises means for allowing passage of said filtration medium through the grid, and a water recirculation system for purifying contaminated water from aquaculture and recirculating purified water to the aquaculture.

19 Claims, 3 Drawing Sheets

WATER FILTRATION SYSTEM AND ITS USE

FIELD OF THE INVENTION

The present invention relates to a filter for purifying water, in particular water from aquacultures. The Invention further relates to a method of purifying water and a water recirculation system for purifying water from an aquaculture and recirculating the water to the aquaculture.

BACKGROUND OF THE INVENTION

Nitrogen in various chemical combinations is a component of the waste products generated by rearing fish. There are four primary sources of nitrogenous wastes: urea, uric acid, and amino add excreted by fish; organic debris from dead and dying organisms; uneaten feed and feces; and nitrogen gas from the atmosphere. Fish expel various nitrogenous waste products through gill diffusion, gill cation exchange, urine, and feces. The decomposition of these nitrogenous compounds is particularly important in intensive recirculating aquaculture systems (RAS) because of the toxicity of ammonia, nitrite, and to some extent, nitrate. The process of ammonia removal by a biological filter is called nitrification, and consists of the successive oxidation of ammonia to nitrite and finally to nitrate. The inverse process is called denitrification and is an anaerobic process where nitrate is converted to nitrogen gas. The denitrification process is becoming increasingly important as fish stocking densities increase and water exchange rates are reduced, resulting in excessive levels of nitrate in the culture system.

Biological treatment processes employ bacteria that grow either attached to a surface (fixed films) or that grow suspended in the water column. Almost all recirculating systems use fixed-film bioreactors, where the nitrifying bacteria grow on either a wetted or submerged media surface. The ammonia removal capacity of biological filters is largely dependent upon the total surface area available for biological growth of the nitrifying bacteria. For maximum efficiency, the media used must balance a high specific surface area, i.e., surface per unit volume, with appreciable void ratio (pore space) for adequate hydraulic performance of the system. The media used in the biofilters must be inert, non-compressible, and not biologically degradable. Typical media used in aquaculture biofilters are sand, crushed rock or river gravel, or some form of plastic or ceramic material shaped as small beads, or large spheres, rings, or saddles. Biofilters must be carefully designed to avoid oxygen limitation or excessive loading of solids, biochemical oxygen demand, or ammonia.

An ideal biofilter would remove 100% of the inlet ammonia concentration, produce no nitrite, require a relatively small footprint, use inexpensive media, require no water pressure or maintenance to operate, and would not capture solids. Unfortunately, there is no one biofilter type that meets all of these ideals, each biofilter has its own strengths and weaknesses and areas of best application. Large-scale commercial recirculating systems have been moving towards the use of granular filters (expanded beds, fluidized beds and floating bead beds). However, there are many types of biofilters that are commonly used in intensive RAS, such as submerged biofilters, trickling biofilters, rotating biological contactors (RBC), floating bead biofilters, dynamic bead biofilters, and fluidized-bed biofilters.

The submerged biofilter includes a volume of biofilter medium upon which nitrifying bacteria grow. The wastewater flows in either an up-flow or a down-flow direction and thus the hydraulic retention time can be controlled by adjusting the water flow rate. Solids from the culture tank can accumulate within the submerged filter, along with cell mass from nitrifying and heterotrophic bacteria. This process can eventually block the void spaces, requiring some mechanism to flush solids from the filter for successful long-term operation. To provide large void spaces to prevent clogging of the filters, the media used for submerged blotters has been traditionally of large size, such as uniform crushed rock over 5 cm in diameter or plastic media over 2.5 cm in diameter. However, 5 cm diameter crushed rock would only have a specific surface area of 75 $m^2/m^3$ and a void fraction of only 40 to 50%. Random packed plastic media would also have a relatively low specific surface area of 100-200 $m^2/m^3$, but a much higher void fraction, greater than 95%. Drawbacks of this type of filter include problems of low dissolved oxygen and solids accumulation, resulting from heavy loading of organic matter and the difficulty of backflushing. Although this type of filter was promoted and used in aquaculture in the past, it has since been replaced in aquaculture due to the inherent high construction costs, biofouling problems, and operational expense.

A recent variation on the submerged biofilter, termed a moving-bed biofilm reactor or a dynamic bed biofilter, uses small slightly buoyant polyethylene tubular media (7 mm long and 10 mm in diameter), in a heavily aerated, submerged bed (Rusten, G., et al. *Water Environm. Res.* 70:1083-1089 (1998)). The tubular media has both internal and external ribs for enhanced surface area and a protected divided interior section to protect the biofilm from being completely stripped off during agitation in the moving bed. The heavy aeration keeps the bed in constant motion, which minimizes dissolved oxygen problems and solids accumulation. These biofilters report low total energy use and a high nitrification rate. The effective surface area for bacterial growth is around 350 $m^2/m^3$. One advantage of this type of biofilter is its low hydraulic head and aeration; its disadvantage is the large aeration requirement to maintain the bed in motion.

Trickling biofilters operate in the same way as submerged biofilters, except the wastewater flows downward over the medium and keeps the bacteria wet, but never completely submerged. Since the void spaces are filled with air rather than water, the bacteria never become oxygen-starved. Trickling filters have been widely used in aquaculture, because they are easy to construct and operate, are self-aerating and very effective at removing gaseous carbon dioxide, and have a moderate capital cost. In municipal waste water treatment systems, trickling filters were traditionally constructed of rocks, but today most filters use plastic media, because of its low weight, high specific surface area (100-300 $m^2/m^3$) and high void ratio (>90%). A range of trickling filter design criteria has been reported. Typical design values for warm water systems are hydraulic loading rates of 100 to 250 $m^3$/day per $m^2$; media depth of 1-5 m; media specific surface area of 100-300 $m^2/m^3$; and TAN removal rates of 0.1 to 0.9 $g/m^2$ per day surface area. Trickling biofilters have not been used in large-scale coldwater systems, probably due to the decrease in nitrification rates that occurs at the lower water temperatures and the relatively low specific surface area of the media. They have found a use in smaller hatchery systems where loads tend to be low and variable.

Rotating biological contactors (RBC) operate by rotating the biofilter media, consisting of disks or tubes, through a tank containing the wastewater. Bacteria attached to the rotating medium are exposed alternately to the wastewater and the atmosphere, which provides oxygen to the biofilm. The medium is typically submerged at a level of 40% of the drum diameter and is rotated at a speed of 1.5-2.0 rpm. Rotating biological contactors have seen some use in fully recirculating systems, because they require little hydraulic head, have low operating costs, provide gas stripping, and can maintain a consistently aerobic treatment environment. In addition, they tend to be more self-cleaning than static trickling filters. The main disadvantages of these systems are the mechanical nature of its operation and the substantial weight gain due to biomass loading of the media and the resultant load on the shaft and bearings. Early efforts using RBC-s often employed under-designed shafts and mechanical components, which resulted in mechanical failure, but a properly designed RBC can be functional and reliable.

The floating bead has become a popular biofilter for the treatment of small or moderate flows, usually less than 1,000-2,000 L/min. The floating bead filters are expandable granular filters that display a bioclarification behaviour similar to sand filters (Malone, R. F. & Beecher, L. E., *Aquacult. Eng.* 22:57-73 (2000)). They function as a physical filtration device or clarifier by removing solids, while simultaneously encouraging the growth of desirable bacteria. They also remove dissolved wastes from the water through biofiltration. Floating bead filters are resistant to biofouling and generally require little water for backwash. The bead filter is typically either bubble-washed or propeller-washed during its backwashing procedure, which expands the bed and separates trapped solids from the beads. The beads used are food-grade polyethylene with a diameter of 3-5 mm and a specific gravity of 0.91, and a moderate specific surface area of 1150-1475 $m^2/m^3$. Bead filters advantages include their modular and compact design, ease of installation, and operation. In addition, they can be used as a hybrid filter for both solids removal and nitrification. Bead filters using propeller-washed backflushing have been built with bead volumes of up to 2.8 $m^3$. Most small-scale systems use the bubble-washed filters, typically less than 0.28 $m^3$.

Fluidized-bed biofilters have been used in several large-scale commercial aquaculture systems (15 $m^3$/min to 150 $m^3$/min or 400 to 4,000 gpm). Their chief advantage is the very high specific surface area of the media, usually graded sand or very small plastic beads. The fluidized-bed biofilter can easily be scaled to large sizes, and are relatively inexpensive to construct per unit treatment capacity. Since the capital cost of the biofilter is roughly proportional to its surface area, fluidized-bed biofilters are very cost competitive and are relatively small in size compared to other types of biofilters (Summerfelt, S. T., in *CIGR Handbook Agric. Eng.* pp. 309-350 (CIGR, Series Ed., Wheaton, F., Volume Ed.), Am. Soc. Agric. Eng. (1999)). The main disadvantages of fluidized-bed biofilters are the high cost of pumping water through the biofilter and that a fluidized-bed biofilter does not aerate the water, as do trickling towers and RBC-s. Additional disadvantages are that they can be more difficult to operate and can have serious maintenance problems, usually due to poor suspended solids control and biofouling.

In fluidized-beds, water flows through the void spaces in the medium, either upward or downward, depending upon the specific gravity of the medium. The bed becomes fluidized when the velocity of the water through the bed is sufficiently large to suspend the medium in the velocity stream, causing the bed to expand in volume. The resulting turbulent motion of the medium provides excellent transport of dissolved oxygen, ammonia-nitrogen and nitrate-nitrogen to the biofilm and shears off excess biofilm. The result is high nitrification capacity in a relatively compact unit, but at the cost of the high energy required to fluidize the filter medium.

The design of the flow distribution mechanism is absolutely critical for reliable operation of fluidized-bed biofilters (Summerfelt, S. T. & Cleasby, I. L, *ASAE Trans.* 39:1161-1173 (1996); Summerfelt, S. T., in *CIGR Handbook Agric. Eng.* pp. 309-350 (CIGR, Series Ed., Wheaton, F., Volume Ed.), Am. Soc. Agric. Eng. (1999)). A variety of mechanisms has been employed to inject the water into the bottom of large fluidized-sand biofilters. Traditionally, some form of pipe manifold, starting at the top of the biofilter and running down through the inside of the reactor, has been used. This header and lateral system creates an additional operating pressure that the pumps must work against, generally on the order of ¼ to ½ of an atmosphere (atm).

The major advantage of fluidized-sand biofilters is their ability to be scaled to capacities to assimilate ammonia production from standing fish biomasses on the order of 50,000 kg. In effect, the fluidized-sand biofilters can be made as large as they need to be to handle a specified fish biomass. Other considerations will dictate the actual fish load, with the primary one being risk associated with catastrophic failure.

All of the above biological filters are designed to perform the same function: oxidizing ammonia and nitrite to nitrate. Thus, the biological filter must be designed to fully oxidize the nitrogen equivalents present in the ammonia produced, with an additional safety margin to account for unforeseen events. From a practical perspective, the biofilter selection is less critical in small production systems, i.e., systems that feed at rates below 50 kg per day, than for larger production systems. In small systems, biofilters can be over-designed and the added cost is generally not of critical importance to the overall economic success of the venture.

Each biofilter described above has advantages and disadvantages that need to be considered during the early design phase. One of the chief advantages of both the trickling biofilter and the RBC is that they both add oxygen to the water flow during normal operation. In addition, they provide some carbon dioxide stripping. In contrast, the submerged biofilters, bead filters, and fluidized-bed biofilters are all net oxygen consumers and rely completely on the oxygen in the influent flow to maintain aerobic conditions for the biofilm. If, for whatever reason, the influent flow is low in dissolved oxygen, anaerobic conditions are generated within the biofilters.

Both the trickling biofilters and the RBC filters have the distinct disadvantage of having low specific surface area medium. Since the capital cost of the filter is proportional to its total surface area, the result is physically large and more costly filters. In contrast, bead filters and especially fluidized-bed filters use media with a high specific surface area. These results in reduced cost and space requirements in comparison to that required to achieve the same surface area in a trickling biofilter or RBC.

An additional disadvantage of the trickling biofilters and the RBC is that they readily biofoul, if suspended solids are not adequately controlled. Carbon-eating heterotrophic bacteria grow 100 times faster than the autotrophic nitrifiers do. Their mass can double in an hour, while it takes nitrifiers days to double. This high growth rate and the associated oxygen demand consequently suffocate the nitrifiers buried deeper in the biofilms, resulting in death and sloughing of the biofilm from the bioreactor surfaces.

Prior to this invention a filtration system has been described, having a chamber with a hydraulic loading area that is divided into a plurality of cells such that each cell has a hydraulic loading area less than 2.3 $m^2$. The system further includes a filter medium, such as microbeads, positioned in each cell to filter water passing through the chamber. Microbeads provide a substrate for bacterial growth during operation of a filtration system. The bacteria growing on the microbeads utilize the ammonia and nitrite as nutrients for even further bacterial growth. The bacterial growth on microbeads also tends to reduce the buoyancy of microbeads.

The limiting factor of the rate of reduction of ammonia in each pass through a biofilter is the rate of diffusion of the reactants through the biofilm. The rate is thus related to the residing time of the water within the medium, e.g. if 50% of ammonia is reduced in a circle, and the residing time is increased by a factor two, 50% of the remaining ammonia will be reduced i.e. a total of 75% of the incoming concentration.

Water channeling is a common problem in filtration systems. If the height of the microbeads in the filtration system is too great, or if the width of the chamber is too great, channeling, i.e. the essentially free flow of water through the center region of the filter, tends to occur. Such channeling decreases the residing time of the reactants through the biofilm, and thus leading to decreased filtering activity. The force that prevents channeling through the medium limits the height as well as diameter of microbead bed. The height of the microbead can typically not exceed 60 centimeters and the area can typically be no greater than about 2,3 $m^2$ for microbeads with strong buoyancy (specific weight 16-30 kg per cubic meter) and diameter between 1-3 mm.

SUMMARY OF THE INVENTION

It is an objective of the present invention to provide an improved filtration system for filtering water. The filtration system comprises at least one chamber which contains a water inlet, means for distributing water, at least one braker grid, and a water outlet. The braker grid serves the role of providing support to the filtration medium within the chamber, and thus preventing water channeling within the chamber. Further advantages of the braker grid are those of providing means of mixing the water and the filtration medium within the chamber, as well as providing means for maintaining a uniform microbial population on the filtration medium.

The filtration system may be comprised of at least two filtration chambers. In such an embodiment, fluid flow into and from the filtration chambers is advantageously adjusted so that the overall flow of water into and from the filtration system is uniform. In this manner, a substantially constant flow of water can be maintained, which means that the filtration system can be used in a water recirculation system.

A further objective of the invention is to provide a method of purifying water, especially water from an aquaculture system. The method includes the steps of providing contaminated water to the filtration system of the invention, and the removal of purified water from the filtration system.

The invention further provides a water recirculation system which is based on the filtration system of the invention. The water recirculation system comprises at least one aquaculture tank, means for supplying water from the tank to a filtration system, a filtration system according to the present invention, and means for supplying water from the filtration system to the at least one aquaculture tank. The system therefore provides recirculation of water, such that contaminated water from the aquaculture is filtered by the filtration system of the invention, and delivered back into the aquaculture. Additional means typically used in water recirculation systems may optionally be present, such as pumping means, means for aeration of water, additional filtering means such as means for removing solid particles from the water.

BREIF DESCRIPTION OF THE DRAWINGS

DETAILED DESCRIPTION OF THE INVENTION

Figure 1:
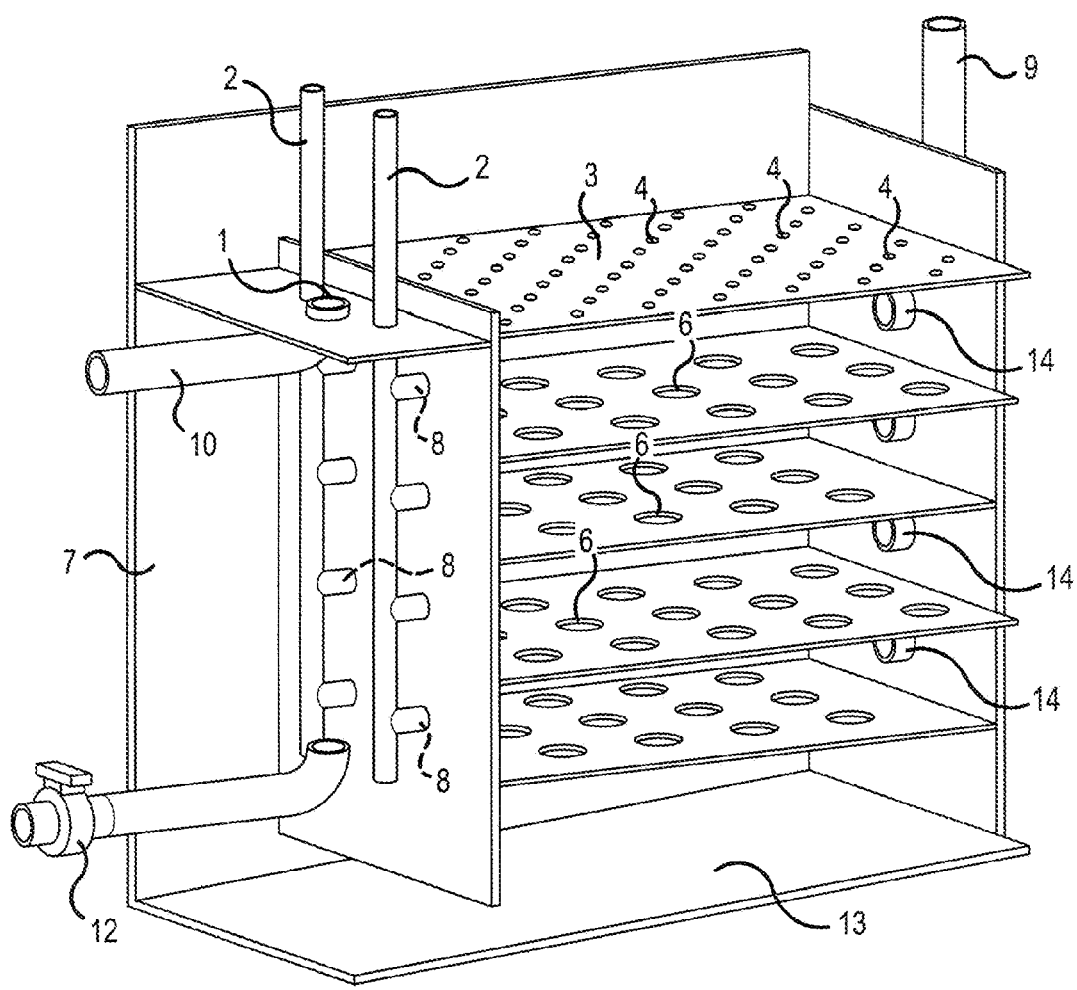
FIG. 1 illustrates a preferred embodiment of one filtration chamber according to the present invention.

In the present context, the term "aquaculture" refers to a medium in which culturing of an animal species is performed in an aqueous environment. Examples of aquacultures are cultures comprised in fish raising tanks, in which fish such as salmon, halibut, cod or other species is reared for human or animal consumption. Other types of cultures of animal or even plant species in an aqueous environment are however compatible with the present definition.

The term "buoyant" refers to the tendency of an object to float or rise in a fluid. This is due to the well-known law of physics that items having an average density lower than that of the fluid medium in which they are placed, tend to rise to the surface of the fluid.

The term "aeration" refers in the present context to the process of delivering oxygen-containing air to a space in need thereof. The air may be ambient air, or it can be any appropriate gaseous mixture containing oxygen in sufficient quantity to provide satisfactory amount of oxygen to the space.

In a first aspect, the present invention provides a filtration system for filtering water. The filtration system comprises at least one chamber, the chamber comprising
  a. a water inlet defining a proximal end of the chamber;
  b. a water outlet defining a distal end of the chamber;
  c. means for water distribution within the chamber;
  d. filtration medium for filtering water passing through the chamber;
  e. at least one braker grid for preventing water channeling within the chamber, wherein said braker grid is positioned substantially distally to said means for water distribution.

The terms "proximal" and "distal" in this context relate to the relative position of the water inlet and water outlet in the filtration system. Due to the nature of the filtration system, the proximal and distal relate to different ends of the system, since water must pass through the filtration system, during which process the water is filtrated due to the microbial purification process provided by the filtration medium.

In one embodiment, proximal is equivalent to upper, i.e. the water inlet is at or near the top of the filtration system. Similarly, in such an embodiment, distal refers to lower, i.e. the water outlet in such a system is at or near the bottom of the filtration system. In such embodiments, water flows by gravitational forces from the Inlet at the top of the filtration system towards the outlet provided at or near the bottom of the filtration system.

Water can be delivered to the filtration system from a number of potential sources, Including aquacultures such as fish raising tanks, in which decontamination for example due to unsatisfactorily high ammonia loads is a common problem. As the contaminated water is delivered from the contaminated water source and enters the filtering system, it comes into contact with bacterial microfilm present on the filtration medium provided in the chamber.

By altering the water level within the chamber from a level substantially distal to said at least one braker grid in a substantially proximal direction, said filtration medium is forced through the braker grid, and wherein by lowering the water level within said chamber, said filtration medium is forced through said at least one braker grid (by gravitational forces).

In one embodiment, the filtration medium comprises particles which are buoyant in water. In a preferred embodiment, the particles are comprised of substantially spherical microbeads. Such microbeads typically will have a diameter in the range of about 0.5-10 mm, such as 0.7-5 mm, such as 0.8-4 mm, such as 1-3 mm. Further, the microbeads will typically have a density in the range of about 2-500 kg/m$^3$, such as about 4-200 kg/m$^3$, such as about 6-100 kg/m$^3$, such as about 8-50 kg/m$^3$.

The braker grid serves several important functions.

1. By providing support to the filtration medium within the chamber, the braker grid prevents water channeling within the chamber.

2. As the braker grid allows impeded passage of the filtration medium, the residence time of the active biofilm with the surrounding contaminated water is increased.

3. The multiple openings or holes within the braker grid provide, together with buoyancy forces, a stirring effect of both water and the filtration medium within the chamber, thus providing increased efficiency of the filter.

4. The stirring and rubbing of individual particles of the filtration medium promotes "scrubbing" of undesired contamination due to dead microorganisms, solid particles, etc, from the filtration particles. As a consequence, the biofilm is maintained at an approximately constant level with time and biofouling effects are minimized.

Thus, the presence of the braker grid leads to several distinct advantages of the present invention, which result in a filtration system with novel and extremely useful properties.

The braker grid may be comprised of any suitable material and be comprised of any suitable three-dimensional structure to achieve the desirable effects of the braker grid of the invention. In one embodiment, the braker grid is comprised of a substantially rigid structure, the structure comprising means for impeded movement of said filtration medium through the structure.

The means for impeded movement of the filtration medium will depend on the type of filtration medium being used, and the overall three-dimensional shape of the filtration system. Thus, in one embodiment, the braker grid comprises a collection of openings for allowing impeded passage of said filtration medium through the braker grid.

The collection of openings may be realized by a variety of specific embodiments. Thus, in one embodiment, the braker grid is comprised of a perforated plate comprising a plurality of substantially spherical holes.

In an alternative embodiment, the braker grid is comprised of a grid comprising substantially rigid elongated rods. The rods may be comprised of any suitable material, preferably a material that is not sensitive to prolonged exposure to air and water. Examples of materials are stainless steel or other suitable metals and alloys, plastic materials, ceramics, or other materials providing necessary structural support of the braker grid and are not moisture-or air sensitive.

In further alternative embodiments, the braker grid may be comprised of any suitable material with any suitable three-dimensional structure that allows impeded movement of said filtration medium through the braker grid. Thus, the grid may be comprised of a suitably porous material, a grid with straight structures or mini-chambers for passage of the filtration medium, or irregular structures, such as labyrinth-like structures, which allow the medium to pass through at an impeded rate due to residence time within the structure, frictional forces, etc.

The openings within the braker grid will In general have an average width in the range of about 1-100 mm, such as in the range of 2-50 mm, such as In the range of 3-30 mm, such as in the range 2-20 mm, such as in the range of 5-10 mm. In other embodiments said openings have an average width in the range of about 10-100 mm, such as in the range of 20-100 mm, including the range of 20-80 mm, such as the range of 20-50 mm. In certain embodiments the openings have a diameter of about 1, 2, 4, 5, 8, 10, 15, 20, 25, 30, 35, 40, 45 or 50 mm, or about 60, 70, 80, 90 or 100 mm. The openings may in some embodiments all have substantially the same diameter or they may have different diameters, typically within the above given ranges. However, the dimensions of the braker grid will depend on the particular embodiment.

As water enters the filtration chamber, the water is distributed within the chamber by suitable means for water distribution. The means for water distribution will therefore in general be located proximally to the braker grid. In a suitable embodiment, the means for water distribution are located near the water inlet of the filtration system. The purpose of said means for water distribution is to provide a substantially uniform distribution of water flow into the chamber. A variety of suitable means for water distribution are known to those skilled in the art. Thus, in one embodiment, the means for water distribution comprise a perforated plate. The plate may in one embodiment be attached to the chamber such that the flow of water distributed within said chamber is limited to the flow of water through said perforated plate. In alternative embodiments, however, water will, in addition to flow through said means for water distribution, be able to by-pass the means, such as adjacent to the outer wall of the chamber.

In another embodiment, the means for water distribution comprise a plurality of nozzles, which may be suitable distributed within the chamber. In one preferred embodiment, the nozzles are substantially uniformly distributed.

The physical dimensions of the chamber are in principle not limited, and the chamber can be of any desirable dimension. In practice, however, the chamber may advantageously have physical dimensions in the range of about 0.5-20 m width, such as in the range of 1-20 m, such as in the range of 2-8 m, including in the range 3-6 m; and a height in the range of about 0.5-10 m, such as in the range of 1-8 m, including in the range of 2-6 m. Several factors, including the desired throughput of the chamber, the nature and shape of the filtration medium, the braker grid and the water distribution system, will determine the desirable physical dimensions of the filtration chamber in any given setting and application.

It may be advantageous to allow aeration of the at least one chamber of the filtration system. Thus, in one embodiment, the filtration chamber comprises at least one air inlet and at least one air outlet. The purpose of aeration is (1) to provide oxygen into the filtration chamber, which is necessary for maintaining activity of aerobic bacteria; (2) allow removal of $CO_2$ gas, which accumulates within the chamber as a result of microbial activity.

Means for aeration can be provided by a variety of methods well known to those skilled in the art. Thus, air inlets may be only one, or they may be several, and they may be designed such that, as the water level increase in the chamber, an air Inlet pipe is flooded by water. By providing multiple air inlets from the air inlet pipe, continuous aeration is possible at any fluid level within the chamber. The air outlet or a plurality of outlets is conveniently located, such as near the proximal (top) end of the filtration chamber.

For aeration, ambient air or any appropriate gaseous mixture can be provided either at or near atmospheric pressure. In a preferred embodiment, aeration is provided by a slight overpressure of the filtration chamber.

The amount of air passing through the chamber in a unit of time will typically be in the range of about 1-10 volumes for each volume of water passing through the chamber, such as in the range of 2-8 volumes, such as in the range of 3-7 volumes, such as in the range 4-6 volumes. It will be apparent to those skilled in the art that the degree of aeration can be suitably adjusted depending on the microbial population of the filtration medium, degree of contamination of the water, temperature, pH and other factors that may influence the degree of aeration required for proper operation of the filtration system.

The hydraulic loading possible by the filtration system of the present invention is quite variable. Thus, depending on the specific embodiment of the invention, hydraulic loading can be in the range of about 5-100 $l/s \cdot m^2$, such as in the range of about 10-70 $l/s \cdot m^2$, such as in the range of about 15-50 $l/s \cdot m^2$, such as in the range of about 23-33 $l/s \cdot m^2$.

Furthermore, the possible hydraulic loading area according to the present invention is expected to be quite large. Thus, while most filtration systems are in general limited to a fairly narrow loading area, the filtration system according to the present invention can have hydraulic loading area in the range of about 0.5-10 $m^2$, such as in the range of 1-8 $m^2$, such as in the range of 2-6 $m^2$.

The filtration system can be comprised of any suitable number of chambers. Thus, the filtration system can in one embodiment comprise at least two chambers, wherein
fluid flow into a first chamber is greater than fluid flow from said first chamber until the fluid level in said chamber has reached a predetermined upper limit;
fluid flow from a second chamber is greater than fluid flow into said second chamber until the fluid level in said chamber has reached a predetermined lower limit;

wherein
fluid flow into and from said first and said second chamber is adjusted so as to achieve a decrease in fluid level in a chamber having reached its upper fluid level and an increase in fluid level in a chamber having reached its lower fluid level;

and wherein
fluid flow into and from additional chambers is alternately greater to and from said additional chambers, such that fluid flow into said filtration system is substantially equal to fluid flow from said filtration system.

By such a configuration and suitable adjustment of means for controlling fluid flow, an approximately uniform flow of water into the filtration system and from the filtration system can be maintained.

The flow of fluid into and from each chamber can be controlled by any suitable means, such as manual or automatic valves. It is envisaged that automatic means for detecting fluid levels within each chamber can be connected to a computer which controls valves that regulate the fluid flow into and from each chamber. By such means, any suitable number of chambers can be simultaneously operated.

As the fluid level in a chamber has reached a lower level, the flow of water into the chamber is increased. The flow of water from the chamber may optionally be turned off at this point. As the water level increases, the filtration means are flooded by water. Due to buoyancy forces, the particles will be driven to the surface of the water. However, due to the braker grid, this movement is impeded, and the particles are therefore at least partially submerged for a period of time, or until they have been driven to the surface of the water within the chamber. If the volume of particles within the chamber is great enough, the entire population of particles will not be able to reach the water surface, and as a consequence at least a portion of the particles remain submerged.

As the predetermined upper fluid level within the chamber is reached, the flow of water is adjusted, so that the water level decreases within the chamber. The flow of water into the chamber may optionally be turned off at this point. The fluid level within the chamber decreases due to increased water flow from the chamber, and as a result, the filtration medium is forced through the braker grid in a general distal direction. This process continues until the predetermined lower fluid level within the chamber has been reached, at which point the overall fluid is adjusted as described above.

As will be apparent, the fluid level within each chamber is determined by the rate of fluid flow to the chamber and the rate of fluid from the chamber (i.e. the net flowrate through the chamber). Convenient means for controlling the fluid flow may be located both distally and proximally to each chamber. However, it is in principle enough to control the flow of water either proximally or distally to each chamber, and the number and types of fluid flow controls will depend on the desired configuration of each filtration system.

By controlling the fluid flow into and/or from each chamber individually, it is possible to maintain an overall uniform flow of water to and from the filtration system. Thus, water flowing into the filtration system is conveniently distributed into the available chambers, depending on the fluid level within each chamber; the overall rate of fluid flow from the filtration system will accordingly be approximately Identical to the rate of fluid flow into the system. This is an important advantage in water recirculation system, where it is important to maintain a uniform flow of water within the system.

According to a second aspect, the present invention provides a method for purifying water, comprising providing water to a filtration system, said system comprising at least one chamber comprising
  a. a water inlet defining a proximal end of the chamber;
  b. a water outlet defining a distal end of the chamber;
  c. means for water distribution within the chamber;
  d. filtration medium for filtering water passing through the chamber;
  e. at least one braker grid for preventing water channeling within the chamber, wherein said braker grid is positioned substantially distally to said means for water distribution, wherein said at least one braker grid comprises means for allowing passage of said filtration media through the braker grid, and wherein substantially purified water is collected from said at least one chamber outlets.

In one embodiment, by altering the water level within said chamber from a level substantially distal to said at least one braker grid in a substantially proximal direction, said filtration medium is forced through the braker grid, and wherein by lowering the water level within said chamber, said filtration medium is forced through said at least one braker grid.

In one embodiment, said filtration medium is comprised of particles which are buoyant in water. In a preferred embodiment, said particles are comprised of substantially spherical microbeads.

The microbeads may have a diameter in the range of about 0.5-10 mm, such as in the range of about 0.7-5 mm, such as in the range of 0.8-4 mm, such as in the range of 1-3 mm. Moreover, the microbeads may have a density in the range of about 2-500 $kg/m^3$, such as in the range of about 4-200 $kg/m^3$, such as in the range of about 6-100 $kg/m^3$, such as in the range of about 8-50 $kg/m^3$.

The braker grid is in one embodiment comprised of a substantially rigid structure, said structure comprising means for impeded movement of said filtration medium through the structure. For example, the braker grid may comprise a collection of openings for allowing impeded passage of said filtration medium through the braker grid.

In one embodiment, the braker grid comprises a perforated plate comprising a collection of substantially spherical holes, preferably such as described herein above. In another embodiment, the braker grid is comprised of a grid comprising substantially rigid elongated rods such as described above.

The means for water distribution may be comprised of a perforated plate, said plate being positioned proximally to said braker grid. The perforated plate may be attached to said chamber such that the flow of water distributed within said chamber is limited to the flow of water through said perforated plate. In another embodiment, the means for water distribution are comprised of a plurality of nozzles. In a preferred embodiment, the nozzles are substantially uniformly distributed.

During the use of the filtration system of the invention, hydraulic loading may be in the range of about 5-100 $l/s·m^2$, such as in the range of about 10-70 $l/s·m^2$, such as in the range of about 15-50 $l/s·m^2$, such as in the range of about 23-33 $l/s·m^2$. The hydraulic loading area may furthermore be in the range of about 0.5-10 $m^2$, such as in the range of about 1-8 $m^2$, such as in the range of 2-6 $m^2$.

According to another aspect of the invention, a water recirculation system for use in fish production is provided, comprising:
  a. at least one aquaculture tank;
  b. means for supplying water from said at least one tank to a filtration system;
  c. a filtration system as described herein for filtering water from said aquaculture tank, the filtration system comprising at least one chamber such as described above; and
  d. means for supplying water from said filtration system to said at least one aquaculture tank.

The water recirculation system may further comprise means for aeration of water, said means being located distally to said filtration system and proximally to said fish raising tank. Such aeration means serve the role of providing adequate oxygen to the water, which is essential for effective function of the fish raising tank.

The system may further comprise means for filtering solid particles from water, said means being located distally to said fish raising tank and proximally to said filtration system. Such filters may be needed to filter solid particles, such as sand or dirt particles, or dead or dying microorganisms, from the water before entering the filtration system Furthermore, the water recirculation means may comprise suitable pumping means, which may be needed for effective circulation of water within the system. Appropriate water pumps or alternative means for pumping water will be apparent to those skilled in the art.

The water recirculation system may further comprise additional components, which are known to those skilled in the art and will be apparent for any specific configuration of the water recirculation system of the present invention.

In the following, preferred embodiments of the invention will be described.

A preferred embodiment of one filtration chamber according to the present invention is illustrated in FIG. 1. A filtration chamber is shown comprising a body 7. Water is provided to the system by the water inlet pipe 1Q, the water entering the chamber through the water inlet 1. At the proximal (top) end of the chamber is a perforated plate 3 comprising a plurality of small holes 4. This plate serves the role of water distribution within the chamber. The holes in the plate provide means for distributing water. The diameter of these holes will determine the rate of water delivery to the rest of the chamber, and as a consequence, the diameter of the holes will be suitably adjusted depending on the overall desired hydraulic load of the chamber. However, in a typical embodiment, the holes will have a diameter in the range of about 1-30 mm, such as in the range of 2-20 mm, including the range of 4-15 mm, such as about 1, 2, 3, 4, 5, 8, 10, 12 or 15 mm.

A braker grid is provided by a series of braker plates 5, each plate having a plurality of perforations or holes 6. The number and dimensions of each hole will depend on the dimensions of the filtration medium used in the chamber. The relative orientation of the holes in adjacent plates in this configuration is such that the holes are not superimposable. This design provides an increased stirring and mixing effect of the filtration medium, as discussed hereinabove. However, it is envisaged that in alternative embodiments, other configurations of the holes are possible.

The filtration medium (not shown) is provided in the chamber between the perforated plate 3 and the bottom plate 13. When the chamber is freed of water or the water level moves towards a lower or minimum level, the filtration medium will migrate towards the bottom of the chamber due to gravitational forces. The total volume of the filtration medium required will depend on several factors, including the efficiency of the microbial culture on the medium, the degree of contamination of the water, the hydraulic load of the chamber, and temperature. However, in a typical embodiment, the filtration medium will take up a volume approximately corresponding to the volume between adjacent braker plates, or approximately one quarter of the volume of the chamber.

In the embodiment illustrated by FIG. 1, means for regulating fluid flow are provided at the distal end of the chamber by a valve 12 located on the water outlet pipe 11. In an alternative embodiment, an additional valve may be located on the inlet pipe 10, for controlling the fluid flow into the chamber.

As water enters the chamber, the filtration medium becomes flooded. Due to buoyancy forces, the filtration medium will migrate towards the surface of the water within the chamber. However, the flow of water into the chamber will typically be rapid enough so that the filtration medium becomes at least transiently submerged. The presence of the braker plates slows down the migration of the filtration medium. As the water level within the chamber reaches an upper limit, the flow of water into the chamber is reduced, the flow of water from the chamber increased, or both. Alternatively, the flow of water into and from the chamber may be turned off, thus allowing an incubation of the water in the chamber with the filtration medium.

The filtration medium will migrate towards the surface of the water within the chamber. At that point, the location of the filtration medium within the chamber will be determined by the water level. Thus, as the water level in decreased, the filtration medium will migrate towards the bottom plate 13 of the chamber, passing through the openings 6 in the braker plates 5.

Means for aeration are provided by the air inlet pipes 2, through multiple air inlets 8. As the water level in the chamber increases above the position of each air inlet, water enters the air inlet pipe. However, alternative air inlets positioned proximally to the submerged air inlets will at that time provide aeration of the chamber. Air subsequently exits through the air outlet pipe 9, which has multiple openings 14 into the chamber for allowing air to exit, independent of the water level within the chamber.

Figure 2:
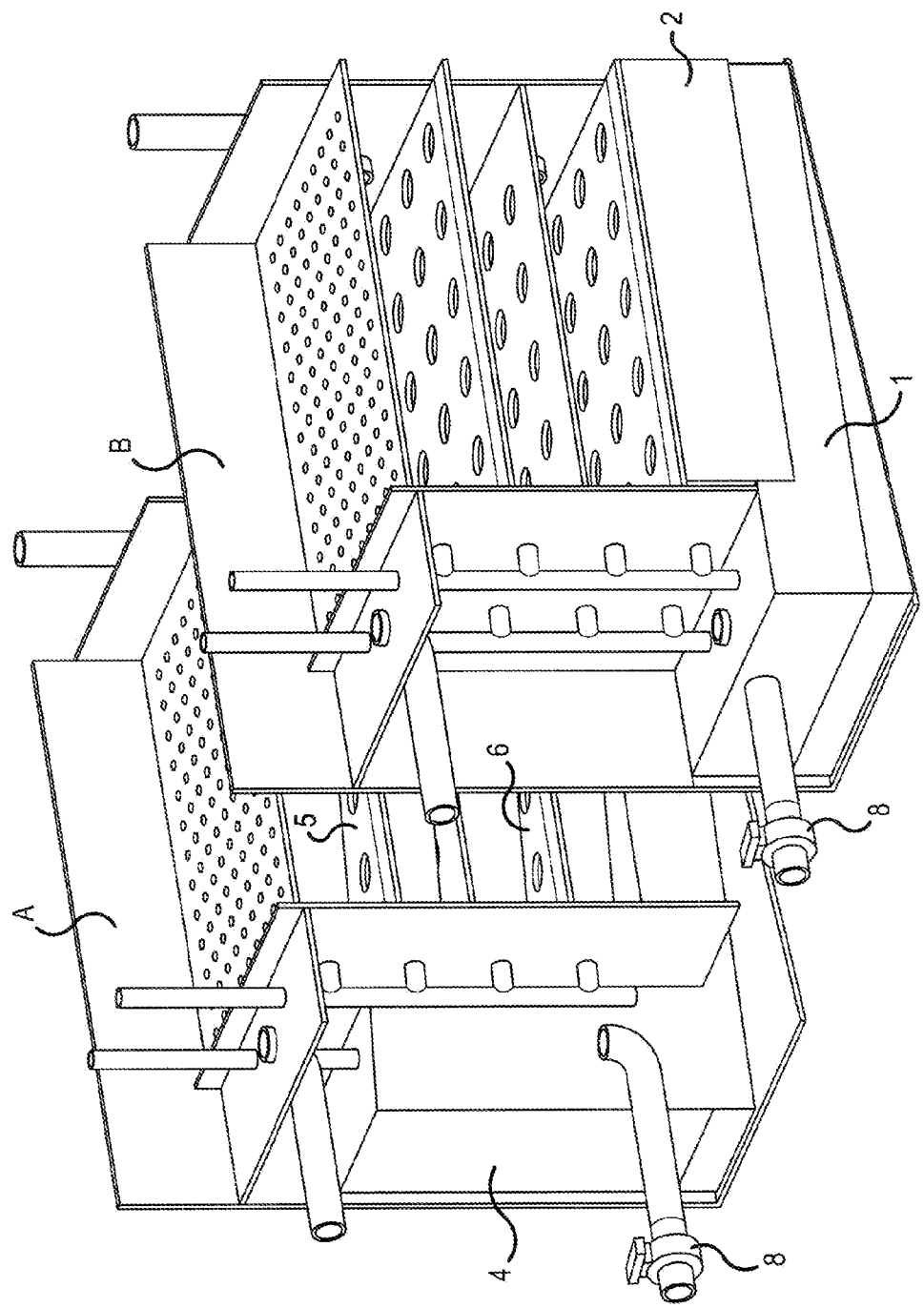
FIG. 2 is a side-view of two filtration chambers; one of which has a water level at a minimum level and the other of which has a water level at an upper limit.

FIG. 2 provides a side-view of two filtration chambers, one of which (B) has a water level at a minimum level, while the other (A) has a water level at an upper limit. The filtration medium is thus at an upper (or proximal) level in view A, while the medium is at a lower (distal) level in view B. To aid in the visualization of the different elements, a cross-sectional view of the water 4 and filtration medium 5 within chamber A is shown, allowing visualization of the braker grid 6.

The filtration medium is shown as a homogeneous grey mass for the purpose of illustration; however as discussed above, the filtration medium compatible with the present invention can comprise a variety of materials including spherical beads. In view A, the water level has been raised from a lower level to an upper level. As a consequence, the filtration medium 5 which tends to float on top of the water 4 due to buoyancy forces, has reached an upper level corresponding to the water level in the chamber. The braker grid 6 allows the medium to pass, albeit at an impeded rate due to the resistance provided by the braker grid.

In view B, the water level is at a minimum level, as shown by the water level 1 being at the level of the water outlet pipe 7. The filtration medium 2 floats on top of the water at this configuration of minimum water level.

In an embodiment comprising two filtration chambers such as those exemplified by A and B, one chamber, exemplified by A, is at any given time being filled to an upper level with contaminated water, while the other chamber, exemplified by B, is at that time being emptied. The relative water level in the chambers is adjusted by controlling the valves 8 positioned on the water outlet pipes 7. Optionally, additional valves may be positioned on the water inlet pipes 9. By suitably controlling the flow of water from the chambers, and optionally also into the chambers, a substantially uniform overall flow of water from two parallely oriented filtration chambers can be achieved.

Figure 3:
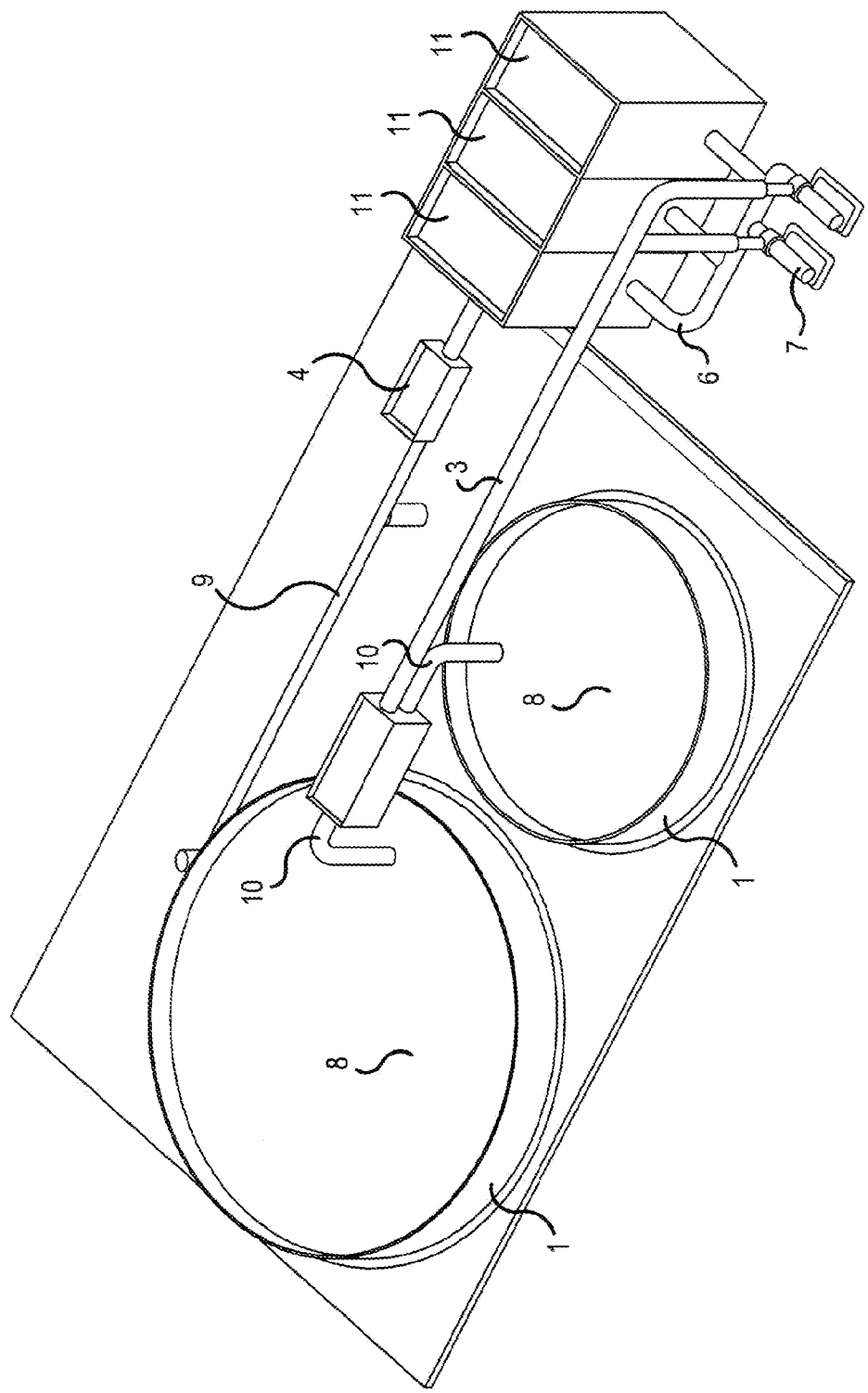
FIG. 3 illustrates a water recirculation system according to the present invention.

One example of a water recirculation system according to the invention is illustrated in FIG. 3. Two aquaculture tanks 1 are shown, each being fed by a water inlet pipe 10, while wastewater from the tanks is removed by the outlet pipe 9.

Contaminated water 8 flows from the aquacultures through the outlet pipes 9, and flows into a filter unit 4, which may for example consist of a microscreen filter. Other filters suitable for any given embodiment or operation are however possible. After passing through the filter unit, contaminated water enters the filtration system 5. In the particular configuration shown, three filtration chambers 11 are provided in the filtration system; however, any desired number of filtration chambers can be present, as discussed in the above.

Contaminated water is purified by the filtration system, whose Individual chamber units ideally operate in tandem, so as to achieve a substantially uniform flow of water to and from the filtration system. Purified water exits the filtration system by means of the individual outlet pipes 6, and is driven through the common pipe 3 leading back to the aquaculture tanks 1 by means of the water pumps 7. An aeration and oxygenation unit 2 is conveniently positioned in between the two aquaculture tanks. After appropriate aeration and oxygenation, purified water re-enters the aquaculture tanks, thus closing the flow of water, and providing a closed recirculation system for the aquaculture.

The invention claimed is:

1. A filtration system for filtering water comprising at least one chamber, said chamber comprising;
 a. a water inlet defining a proximal end of the chamber;
 b. a water outlet defining a distal end of the chamber;
 c. means for water distribution within the chamber;
 d. filtration medium for filtering water passing through the chamber;
 e. at least one braker grid for preventing water channeling within the chamber, wherein said braker grid is positioned substantially distally to said means for water distribution, and
 by altering the water level within said chamber from a level substantially distal to said at least one braker grid in a substantially proximal direction, said filtration medium is forced through the braker grid, and wherein by lowering the water level within said chamber, said filtration medium is forced through said at least one braker grid.

2. The filtration system according to claim 1, wherein said filtration medium is comprised of particles which are buoyant in water.

3. The filtration system according to claim 2, wherein said particles are comprised of substantially spherical microbeads.

4. The filtration system according claim 1, wherein said braker grid is comprised of a substantially rigid structure, said structure comprising means for impeded movement of said filtration medium though the structure.

5. The filtration system according to claim 4, wherein said braker grid comprises a collection of openings for allowing impeded passage of said filtration medium through the braker grid.

6. The filtration system according to claims 5, wherein said braker grid comprises a perforated plate comprising a collection of substantially spherical holes.

7. The filtration system according to claim 5, wherein said braker grid is comprised of a grid comprising substantially rigid elongated rods.

8. The filtration system according to claim 5, wherein said openings have an average width in the range of about 1-100 mm.

9. The filtration system according to claim 1, wherein said means for water distribution comprise a perforated plate, said plate being positioned proximally to said braker grid.

10. The filtration system according to claim 9, wherein said perforated plate is attached to said chamber such that the flow of water distributed within said chamber is limited to the flow of water through said perforated plate.

11. The filtration system according to claim 1, wherein said means for water distribution comprise a plurality of nozzles.

12. The filtration system according to claim 1, wherein hydraulic loading is in the range of about 5-100 $l/s \cdot m^2$.

13. The filtration system according to claim 1, wherein hydraulic loading area is in the range of about 0.5-10 $m^2$.

14. The filtration system according to claim 1, wherein said filtration system contains at least two chambers, and wherein
 fluid flow into a first chamber is greater than fluid flow from said first chamber until the fluid level in said chamber has reached a predetermined upper limit;
 fluid flow from a second chamber is greater than fluid flow into said second chamber until the fluid level in said chamber has reached a predetermined lower limit;
 wherein
 fluid flow into and from said first and said second chamber is adjusted so as to achieve a decrease in fluid level in a chamber having reached its upper fluid level and an increase in fluid level in a chamber having reached its lower fluid level;
 and wherein
 fluid flow into and from additional chambers is alternately greater to and from said additional chambers, such that fluid flow into said filtration system is substantially equal to fluid flow from said filtration system.

15. A water recirculation system for use in fish production comprising:
 a. at least one aquaculture tank;
 b. means for supplying water from said at least one tank to a filtration system;
 c. a filtration system as defined by claim 1
 d. means for supplying water from said filtration system to said at least one aquaculture tank.

16. The water recirculation system according to claim 15, further comprising means for aeration of water, said means being located distally to said filtration system and proximally to said at least one aquaculture tank.

17. The water recirculation system according to claims 15, further comprising means for filtering solid particles from water, said means being located distally to said at least one aquaculture tank and proximally to said filtration system.

18. A method of purifying water, comprising providing water from an aquaculture to a filtration system, said system comprising at least one chamber comprising a. a water inlet defining a proximal end of the chamber;
 b. a water outlet defining a distal end of the chamber;
 c. means for water distribution within the chamber;
 d. filtration medium for filtering water passing through the chamber;
 e. at least one braker grid for preventing water channeling within the chamber, wherein said braker grid is positioned substantially distally to said means for water distribution, and wherein said at least one braker grid comprises means for allowing passage of said filtration medium through the braker grid, and wherein substantially purified water is collected from said at least one chamber outlets.

19. The method according to claim 18, wherein by altering the water level within said chamber from a level substantially distal to said at least one braker grid in a substantially proximal direction, said filtration medium is forced through the braker grid, and wherein by lowering the water level within said chamber, said filtration medium is forced through said at least one braker grid.

* * * * *